(12) United States Patent
Wachter

(10) Patent No.: US 9,253,118 B2
(45) Date of Patent: Feb. 2, 2016

(54) MATRIX ROUTER AND METHOD OF SWITCHING

(71) Applicant: Thinklogical, LLC, Milford, CT (US)

(72) Inventor: Lawrence J. Wachter, Oxford, CT (US)

(73) Assignee: THINKLOGICAL, INC., Milford, CT (US)

( * ) Notice: Subject to any disclaimer, the term of this patent is extended or adjusted under 35 U.S.C. 154(b) by 307 days.

(21) Appl. No.: 13/826,280

(22) Filed: Mar. 14, 2013

(65) Prior Publication Data

US 2013/0322879 A1    Dec. 5, 2013

Related U.S. Application Data

(60) Provisional application No. 61/652,910, filed on May 30, 2012.

(51) Int. Cl.
*H04L 12/933* (2013.01)

(52) U.S. Cl.
CPC .................................. *H04L 49/1515* (2013.01)

(58) Field of Classification Search
IPC ........... H04Q 11/0005,11/06, 2011/0015; H04L 49/15, 49/101, 12/5693, 49/1576
See application file for complete search history.

(56) References Cited

U.S. PATENT DOCUMENTS

2008/0317015 A1*  12/2008  Beshai .......................... 370/380

* cited by examiner

*Primary Examiner* — Fan Ng
(74) *Attorney, Agent, or Firm* — Cantor Colburn LLP

(57) ABSTRACT

A matrix router and method of switching comprising a combined input stage and output stage (I/O stage) having m matrix switch(es), each matrix switch having n inputs and n outputs, each input of said n inputs switchable within said matrix switch to any output of said n outputs, k core outputs and k core inputs, each input of said n inputs switchable to any core output of said k core outputs and each core input of said k core inputs switchable to any output of said n outputs; and a core stage having a matrix switch at least with m times k core stage inputs and at least m times k core stage outputs, each core stage input connected to one core output of said I/O stage, and each core stage output connected to one core input of said I/O stage, where m, n and k are integers and m≥1, n≥2, k≥n.

10 Claims, 9 Drawing Sheets

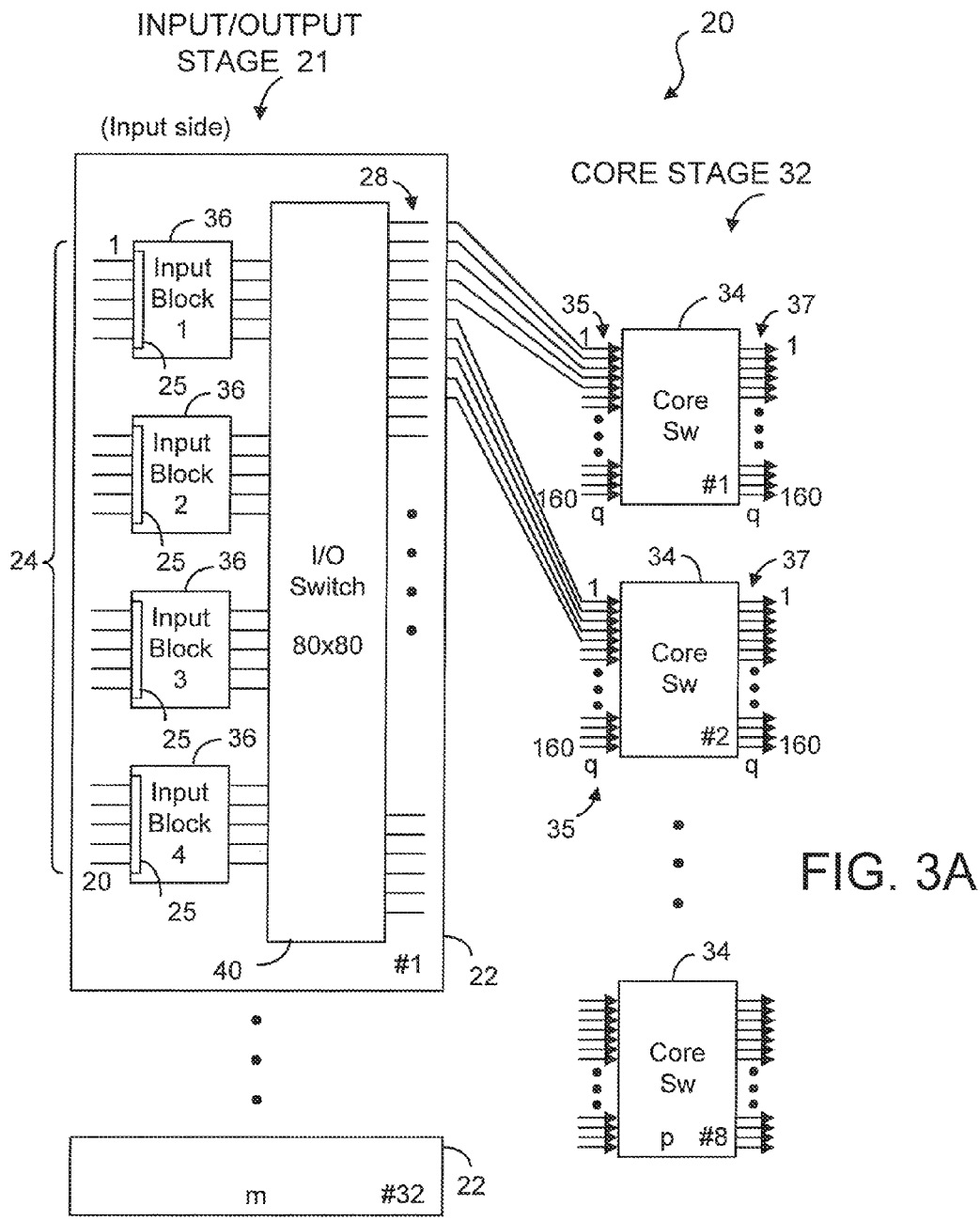
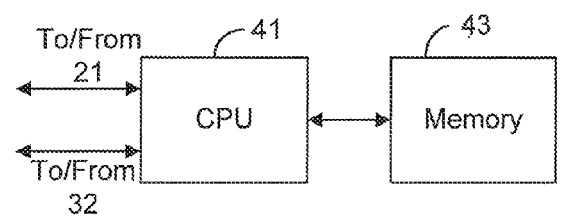
FIG. 3C

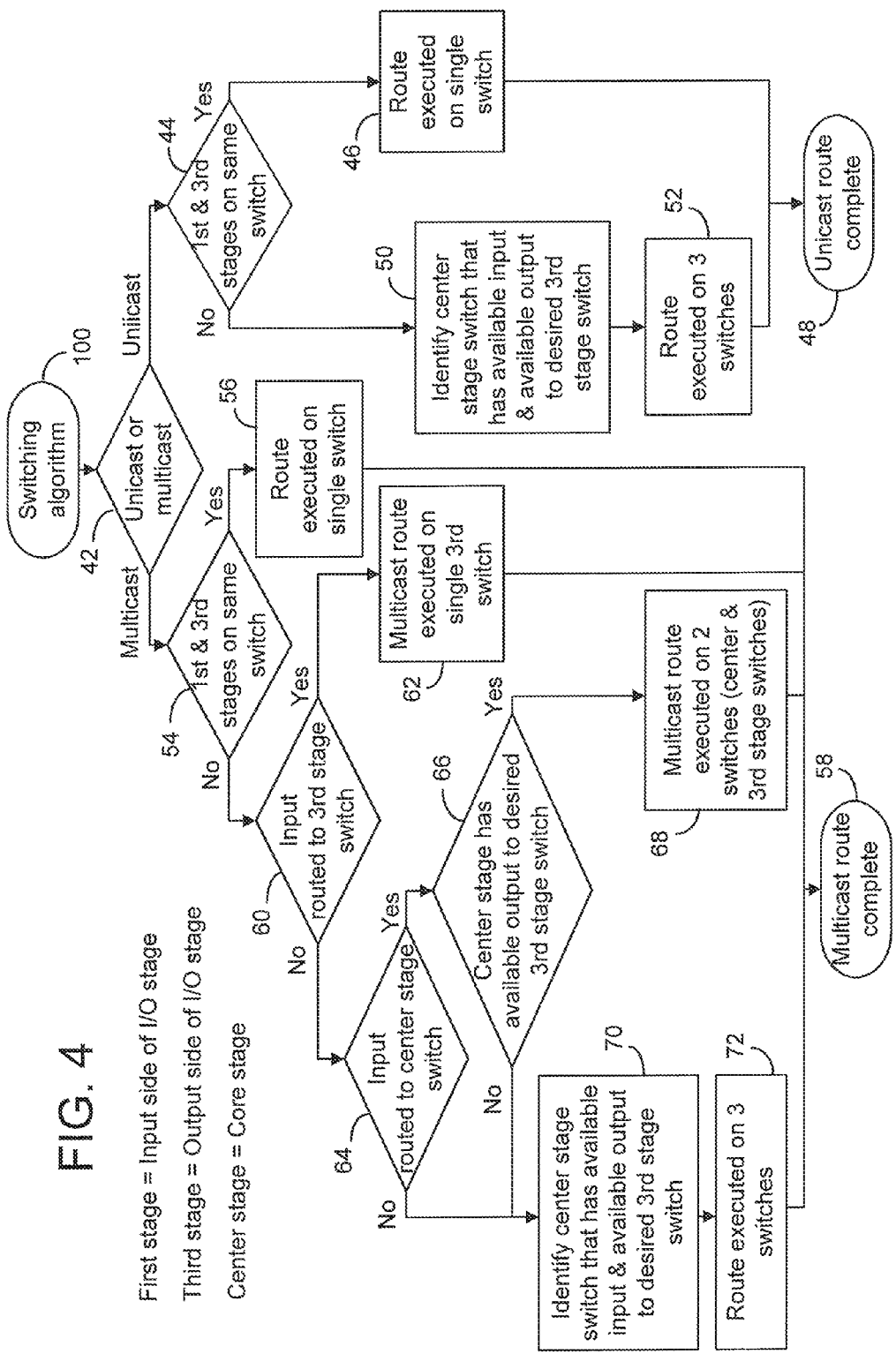

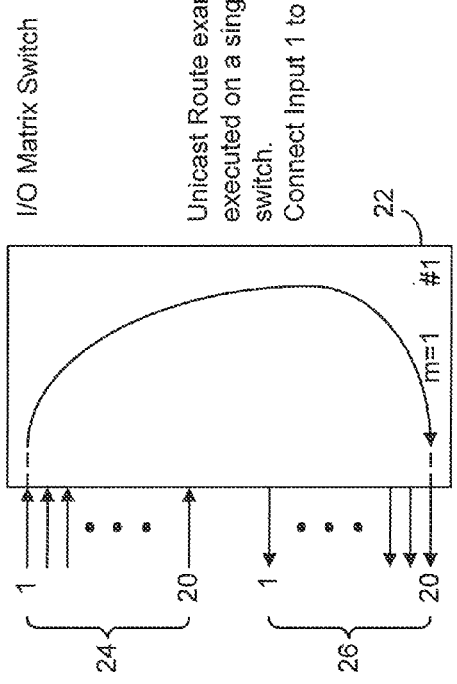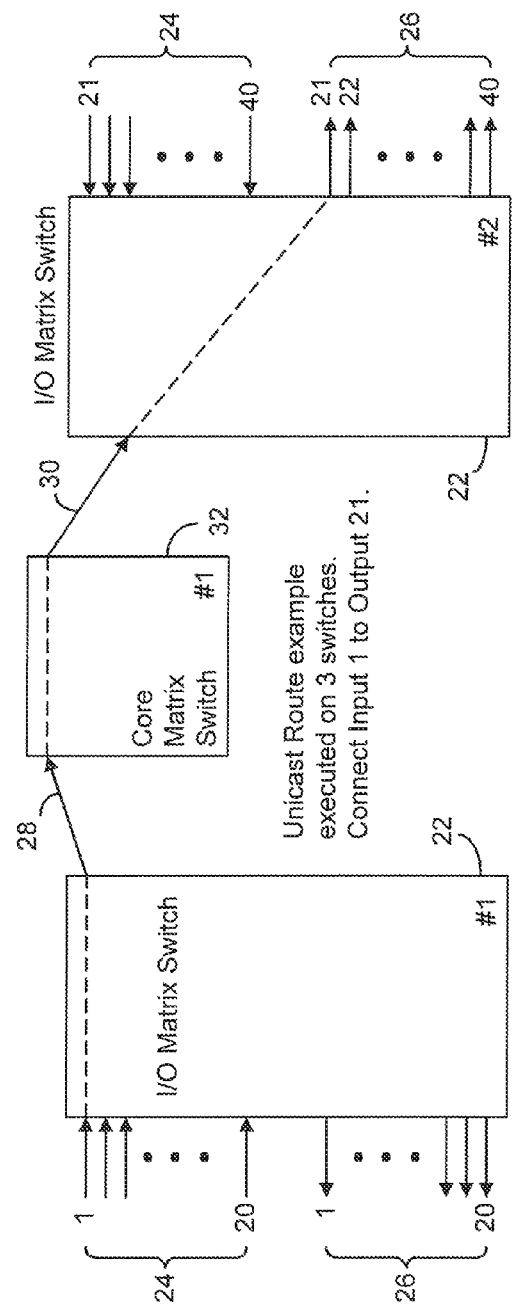
FIG. 5A
FIG. 5B

Multicast Route example executed on two 3rd stage switches.
Connect Input 1 to Output 21 and Output 41

MATRIX ROUTER AND METHOD OF SWITCHING

CROSS REFERENCE TO RELATED APPLICATION

This application claims priority under 35 USC §119 to U.S. Provisional Patent Application No. 61/652,910 filed on May 30, 2012, whose entire contents are hereby incorporated by reference.

TECHNICAL FIELD

The present invention relates to matrix routers and method of switching that allow a given input to be routed to any given output in a non-blocking arrangement, as well as to allow any given input to be routed to multiple outputs.

BACKGROUND OF THE INVENTION

In the field of telecommunications and, in particular, telephony, there has been an on-going need to allow any given input to be connected to any given output, such as any given input telephone number to be routed to any desired telephone number. In the field of telecommunications, this has typically been done with what are known as crossbar (or crosspoint) switches. Each such switch is a switch matrix. In particular, a given type of network is known as a Clos network which is a type of multistage circuit switching network. FIG. 1 of the present application illustrates the architecture of a typical Clos network. Such a network takes advantage of connecting smaller crosspoint switches together to create a larger matrix router. The term "matrix router" is a matrix switch, typically of such a large dimensionality that it cannot be practically implemented in a single matrix switch.

In FIG. 1, N discrete inputs can be routed to N discrete outputs. In order to do this, the Clos network employs an input stage (also called an ingress stage or first stage) of m crosspoint switches, each having a dimensionality less than N, each crosspoint switch having n inputs and k outputs, where $k \geq n$ (all variables are integers). In order to allow non-blocking switching of any input (1 ... N) to any output (1 ... N), a middle stage (also called a core stage or second stage) of k matrix switches, each having m inputs and m outputs, and an output stage (also called an egress stage or third stage) comprising m crosspoint switches each having k inputs and n outputs is used. Thus, each of the m matrix switches of the input stage has a similar configuration to each of the m matrix switches of the output stage. This type of network is required when the circuit switching requirements of a network are greater than the reasonable capacity of the largest single crosspoint switch matrix (that is, the largest value of $k \leq N$).

As noted in a treatise at Wikipedia.org, (www.wikipedia.org/wiki/Clos-network, rev 12 August 2012) the major advantage of the Clos network is that the size of the matrix switches can be significantly smaller than the entire switching network which could be implemented by one large crosspoint matrix switch.

Thus, the matrix router (crosspoint network) is defined by the three integers, n, m and k where n represents the number of inputs which feed into each of m crosspoint switches and k is the number of outputs at each crosspoint switch for the ingress and egress stages (first and third stages), while there are k matrix switches in the core stage, each having m inputs and m outputs. Thus, each middle (core) stage matrix switch is connected exactly once to each egress stage switch, while each ingress stage switch has exactly one output connected to each core stage switch. For strict-sense non-blocking without the need for rearrangeability (not requiring that an existing connection be rearranged in order to accommodate a new connection) the Clos requires $k \geq 2n-1$.

One problem with the classic Clos network is that it requires three stages of switching. However, connections through the center (core) crosspoint switches will begin to block new connections when there are connections of one input to multiple outputs (multicasting). The present invention provides an improved architecture for routing with enhanced multicast capability.

SUMMARY OF THE INVENTION

According to a first embodiment of the present invention, a matrix router comprises a combined input stage and output stage (I/O stage) having m matrix switch(es), each matrix switch having n inputs and n outputs, each input of said n inputs switchable within said matrix switch to any output of said n outputs, k core outputs and k core inputs, each input of said n inputs switchable to any core output of said k core outputs and each core input of said k core inputs switchable to any output of said n outputs; and a core stage having a matrix switch at least with m times k core stage inputs and at least m times k core stage outputs, each core stage input connected to one core output of said I/O stage, and each core stage output connected to one core input of said I/O stage, where m, n and k are integers and $m \geq 1$, $n \geq 2$, $k \geq n$.

Another embodiment of the present invention is a matrix router as described above, where $k \geq 2n-1$.

A further embodiment of the present invention is a matrix router as described above, where $k \geq 2n$.

A still further embodiment of the present invention is a matrix router as described above, wherein the core stage comprises p core matrix switches, each core matrix switch having q matrix core stage inputs and q matrix core stage outputs, where p is an integer and $p \geq (m \times k)/q$.

Another embodiment of the present invention is a matrix router as described above, wherein k=40, m=32, and q=40.

A further embodiment of the present invention is a matrix router as described above, wherein each matrix switch of the I/O stage and each core matrix switch of the core stage is an electrical switch and wherein the I/O stage includes an optical to electrical converter for each of the n inputs and an electrical to optical converter for each of the n outputs.

A still further embodiment of the present invention is a matrix router as described above, wherein each matrix switch of the I/O stage and each core matrix switch of the core stage is an optical matrix switch.

Another embodiment of the present invention is a matrix router as described above, wherein each matrix switch of the I/O stage and each core matrix switch of the core stage is an electrical switch and wherein the I/O stage includes an optical to electrical converter for each of the n inputs and an electrical to optical converter for each of the n outputs.

A further embodiment of the present invention is a matrix router as described above, wherein each matrix switch of the I/O stage and each core matrix switch of the core stage is an optical matrix switch.

A still further embodiment of the present invention is a method of switching inputs to outputs using a matrix router having a combined input stage and output stage (I/O stage) having a plurality of matrix switches, each matrix switch having inputs and outputs, each input switchable within said matrix switch to any output of said switch, core outputs and core inputs, each input switchable to any core output and each core input switchable to any output; and a core stage (center stage) having a plurality of matrix switches, each core stage matrix switch having core stage inputs and core stage outputs, each core stage input connected to one core output of said I/O stage, and each core stage output connected to one core input of said I/O stage, comprising the steps of determining if an input is to be switched to a single unicast output or to multicast outputs, if unicast, determining if the input and output are on a same input/out (I/O) matrix switch and if on the same I/O matrix switch routing the input to the output on the same I/O matrix switch, otherwise identifying a center stage matrix switch that has an available core stage input and an available core stage output to the desired output on a different I/O matrix switch and routing the input to the output on the different I/O matrix switch via said center stage matrix switch; and if multicast, determining if the I/O input is already routed to a center stage matrix switch, and if already routed to a center stage matrix switch, determining if that center stage matrix switch has an available core stage output that is directed to an I/O matrix switch of the desired outputs and routing the input to the desired outputs of said I/O matrix switch via said center stage matrix switch, otherwise identifying a center stage matrix switch that has an available core stage input and core stage output to the desired outputs of another I/O matrix switch and routing the input to the desired outputs via said identified center stage matrix switch.

BRIEF DESCRIPTION OF THE DRAWINGS

For a fuller understanding of the nature and objects of the present invention, reference is made to the following detailed description taken in connection with accompanying drawings in which:

FIG. 4 is a flow chart of an algorithm according to the present invention for carrying out both unicast and multicast switching of an input.

FIG. 5A is an example of a unicast route executed on a single I/O matrix switch.

FIG. 5B is an example of a unicast route executed on two I/O matrix switches and one core matrix switch.

DETAILED DESCRIPTION

Figure 1:
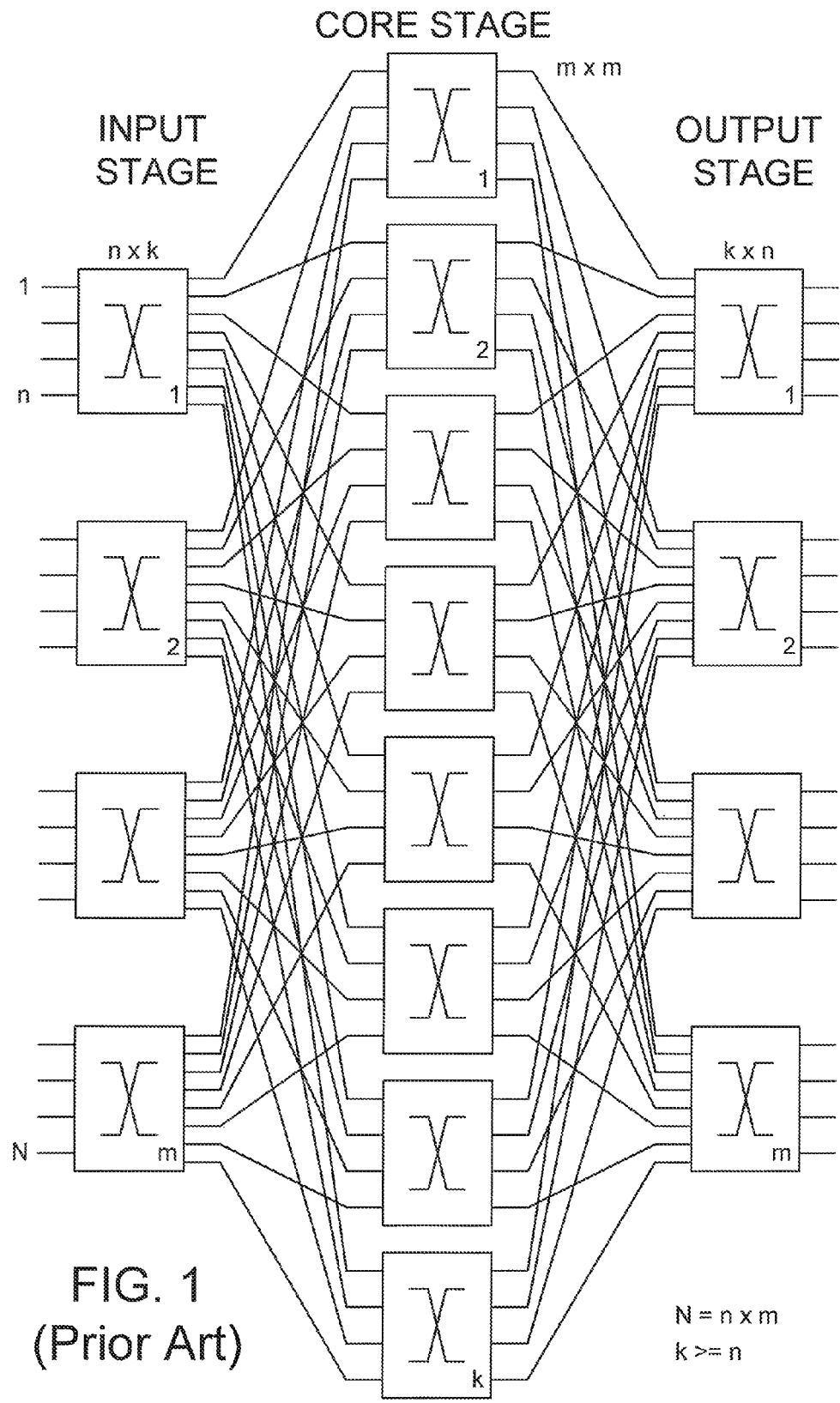
FIG. 1 is a prior art representation of a Clos network.

As best seen in FIG. 1, a classic three stage matrix router is a matrix router known as a Clos network in honor of Charles Clos who devised the mathematical formulation for a multistage circuit switch network that is non-blocking while allowing any given input (from 1 to N) to be switched to any given output of the output stage. Such a three stage matrix router comprises m matrix switches in the input stage each having n inputs and k outputs and a corresponding number of m matrix switches in the output stage, each having k inputs and n outputs. In addition, there are k matrix switches in the core stage each having m inputs and m outputs (all variables are positive integers).

With this configuration there is what is known as strict-sense non-blocking if $k \geq 2n-1$. Strict-sense non-blocking means that an unused input on an input matrix switch can always be connected to an unused output on an output matrix switch without having to rearrange any existing connection between any input and any output.

Although such a three stage matrix router was originally developed for purposes of minimizing the size of matrix switches for use in telephony and specifically for minimizing the size of such matrix switches known as crossbar switches (electromechanical switches commonly used in telephony for pulse-type dialing), the same mathematical basis for switching pertains to any type of switching, including that associated with optical switching.

The present invention is directed to a matrix router and, in particular, a matrix router that can in an embodiment be used for optical switching, where the matrix router which has improved characteristics relative to the Clos network, particularly with respect to what is known as multicast (or multicasting) capability, that is, where a single input is directed to multiple outputs. The present invention is also directed to a corresponding method of switching.

Figure 2:
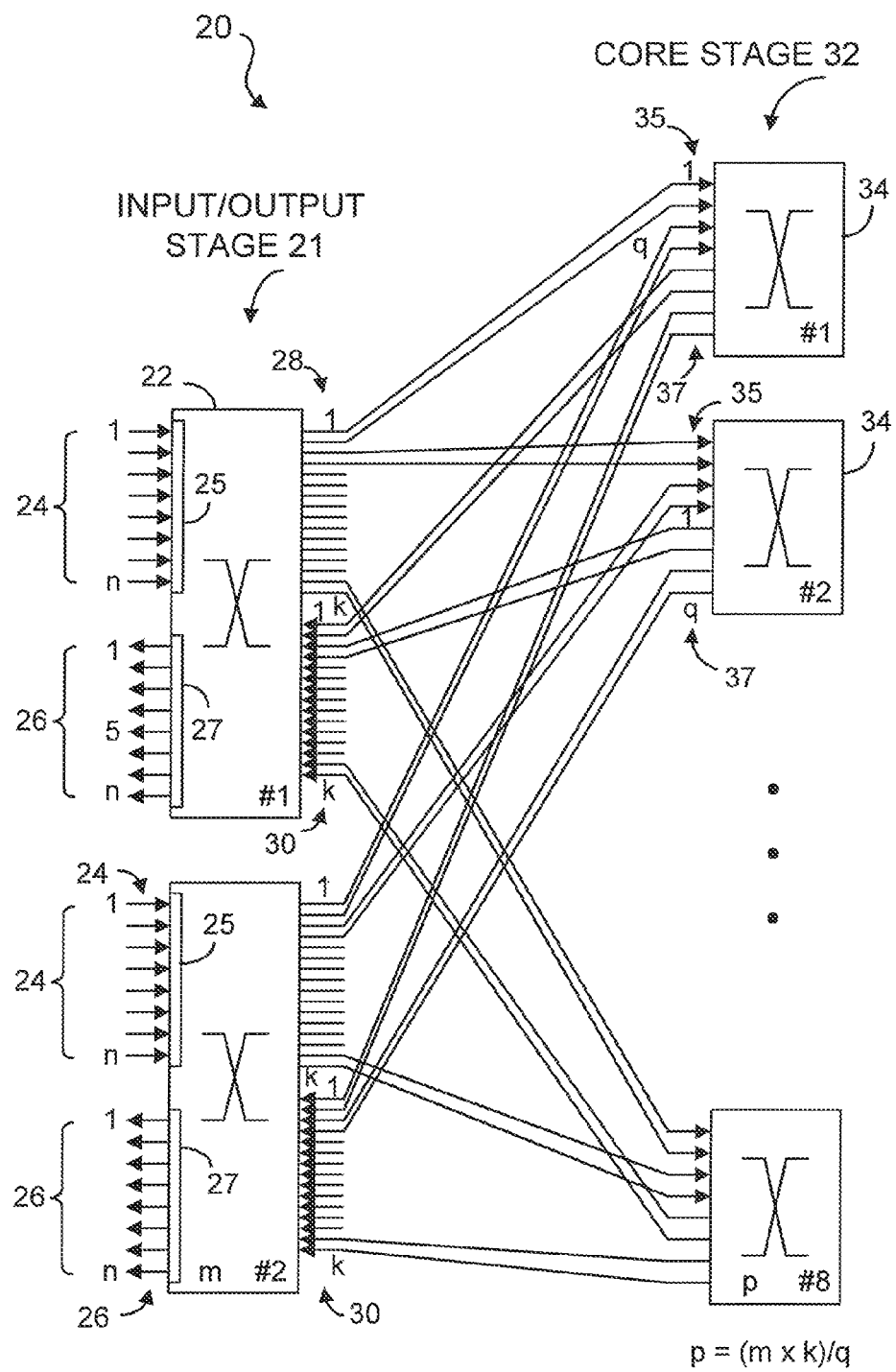
FIG. 2 is a block diagram of a matrix router according to an embodiment of the present invention.

FIG. 2 shows a matrix router 20 according to an embodiment of the present invention that corresponds in size (dimensionality) to the embodiment of the Clos network shown in FIG. 1, but wherein input stages and output stages are combined into a single input/output stage 21, comprising a plurality of matrix switches 22, each matrix switch having n inputs 24 and n outputs 26. In addition, each matrix switch in the I/O stage comprises k core outputs 28 and k core inputs 30. Each I/O matrix switch also allows any of the n core inputs of that given switch to be connected to any of the n outputs 26 of the same switch without use of core stage 32. Thus, in the example shown in FIG. 2, input 1 of the uppermost I/O matrix switch 22 could be directly connected to output 5 of the same switch. Such switching is done internally within the specific I/O matrix switch 22. Therefore, each matrix switch 22 must have a minimum of (n+k)×(n+k) switching permutations. In the example shown in FIG. 2 where n=8 and k=16 (that is, 2n), each matrix switch 22 would have a minimum of 24×24 (i.e., 576) overall configurations. Of course, a switch with a larger number of switch configurations between inputs and outputs (including core outputs and core inputs) could be used.

For example, for a 640×640 implementation of a matrix router according to the present invention, the input/output matrix switches are based upon an 80×80 I/O matrix switch so as to accommodate 20 inputs and 20 outputs, as well as 40 core outputs and 40 core inputs. At a minimum, the I/O switch would have a size (dimensionality) of at least (20+40)×(20+40), that is, a 60×60 or 3600 switch configurations for its I/O switch.

Referring again to the implementation of the matrix router shown in FIG. 2, I/O stage 21 comprises two I/O matrix switches 22. Furthermore, the matrix router 20 has a core stage 32 having a plurality (p) of core matrix switches 34, each core matrix switch having q core inputs 35 and q core outputs 37, where the total number of core inputs (q×p) and the total number of core outputs (q×p) equal the total number of core outputs (n×m) and the total number of core inputs (n×m) of I/O stage 21. Again, in the example shown in FIG. 2 where k=16 and the number (m) of I/O matrix switches is equal to 2, the total number of core outputs is equal to 32 and the total number of core inputs is also equal to 32. Therefore, the total number of matrix core inputs 35 (q×p) is equal to 32 and the total number of matrix core outputs 37 (q×p) is also equal to 32. In the implementation shown in FIG. 2, each core matrix switch 34 in the core stage has four inputs (q=4) and four outputs (q=4) and therefore there are eight total matrix switches 34 in the core stage (p=8). The number of core matrix switches (p) of input size q and output size q is therefore p=(m×k)/q. Although each I/O matrix switch 22 and each core matrix switch 34 can be an optical switch, this arrangement is not always practical.

It is therefore an embodiment of the present invention where each I/O matrix switch 22 and each core matrix switch 34 each is an electrical matrix switch. In this configuration, each of the n inputs of each I/O matrix switch 22 includes an optical to electrical (O/E) converter 25 and each of the n outputs of the I/O matrix switch includes an electrical to optical (E/O) converter 27.

Simulations have been conducted to compare the multicast capability of the present invention to the Clos type network. In the simulations, a simple sequential connection set was conducted where a single random input was connected to a single random output. The outputs that were previously used would be overwritten if required. The resulting connection set therefore had both unicast and multicast connections. Initially the simulations were performed for a design embodiment where the I/O matrix switches 22 of the present invention contained a single 12×12 dimension (i.e., a 4×8 input stage and the 8×4 output stage). This particular design of the present invention had the capability of locally connecting I/O matrix switch groups of four inputs and four outputs using the 12×12 dimensionality (the other 8 inputs and 8 outputs being for the core inputs and core outputs).

In the simulation, the worse case scenario resulted in a blocking condition after 885 random connections for the present invention. This probability is known to be significantly lower than for a correspondingly sized Clos network.

This same random connection set was simulated using an embodiment of the present invention where five of the 12×12 matrix switches were combined into a single 60×60 matrix switch. This design had a local connection capability of 20 inputs and 20 outputs and showed no blocking conditions after 1 billion random connections. Thus, the overall simulation results showed that multicast blocking when unicast and multicast simulations were performed for a matrix router occurred at a significantly lower probability than for a similarly sized Clos network, and that this blocking probability decreased with an increase in size of the I/O matrix switches.

Although the mathematical analysis supporting this observed lower blocking probability of the present invention as compared to a Clos type matrix router has not been fully formulated, it is believed to be based upon the switching redundancy capability of the present invention in view of each I/O matrix switch 22 being capable of switching any given input of that switch to any given output of that same switch, without the necessity for accessing the core stage.

Figure 3B:
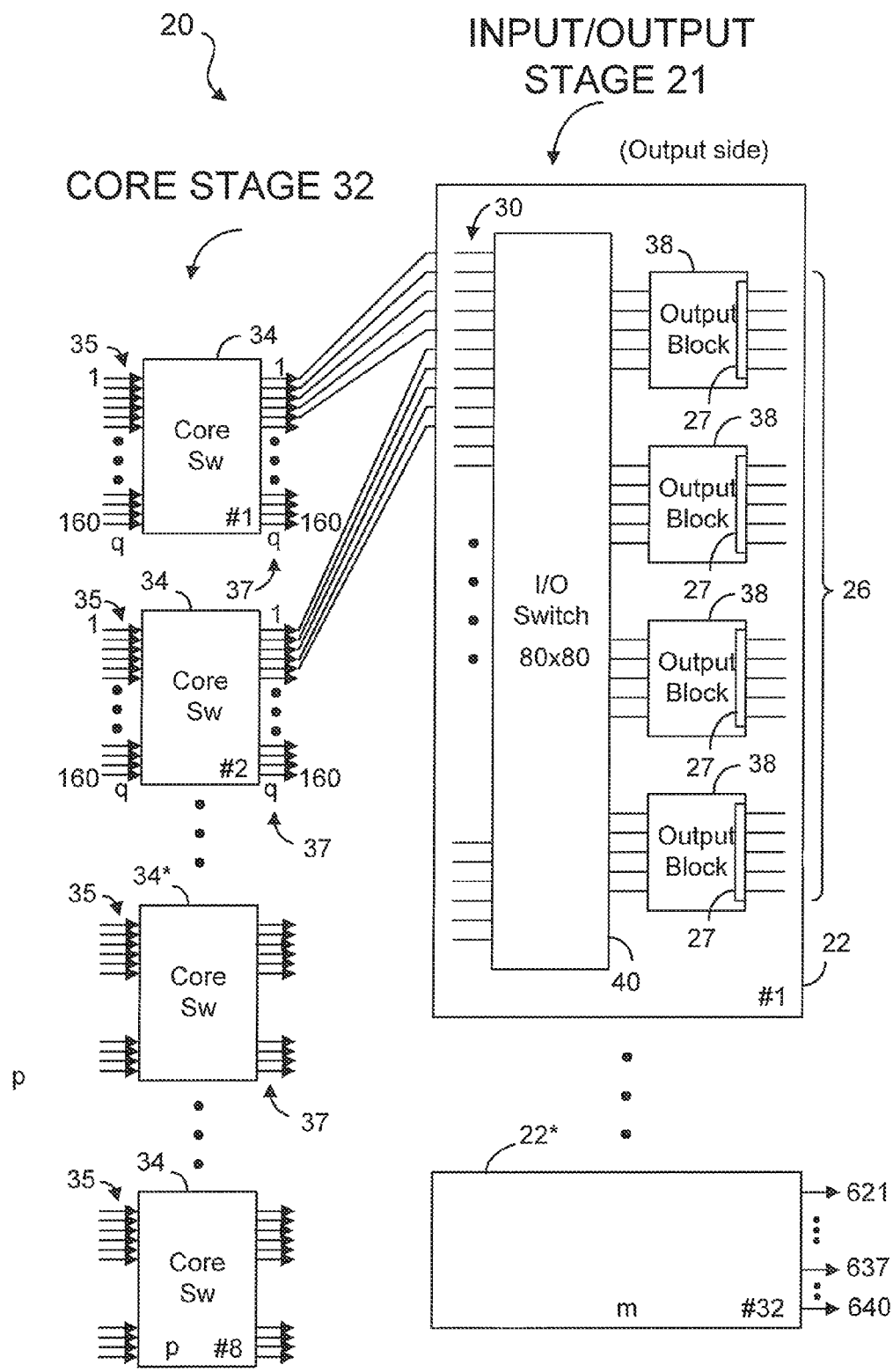
FIG. 3 comprising FIGS. 3A and 3B, put together as shown in FIG. 3C, is a block diagram of a specific implementation of an embodiment of the present invention as shown in FIG. 2.

FIGS. 3A and 3B illustrate a specific implementation of a 640×640 matrix router 20 according to an embodiment of the present invention which comprises thirty-two I/O stage matrix switches 22, each having twenty inputs 24 (n=20) and twenty outputs 26 (n=20), as well as forty core outputs 28 (k=40) and forty core inputs 30 (k=40). For purposes of clarity, FIG. 3A illustrates the matrix switches 22 from the input side while FIG. 3B illustrates the matrix switches from the output side, although in actuality each matrix switch contains both the input side and the output side.

Each I/O matrix switch 22 further comprises a plurality of input blocks 36 and a plurality of output blocks 38. These input and output blocks each can respectively include an O/E converter 25 for each of the n inputs and an E/O converter 27 for each of the n outputs for an embodiment that uses electrical matrix switches for the internal switching of the I/O stage 21 and the core stage 32. In the specific implementation shown in FIGS. 3A and 3B, each O/E converter 25 accommodates five inputs and each E/O converter 27 accommodates five outputs. Each I/O matrix switch 22 further includes an 80×80 internal I/O switch 40, again shown on both sides of FIGS. 3A and 3B for purposes of clarity.

For the implementation shown in FIGS. 3A and 3B, there are thirty-two I/O matrix switches 22, each with a similar configuration; that is, 20 inputs (n=20), 20 outputs (n=20), 40 core outputs (k=40) and 40 core inputs (k=40).

FIGS. 3A and 3B also show that the core stage 32 can comprise a plurality of core matrix switches 34. Each core matrix switch in this implementation has 160 core stage inputs (q=160) and 160 core stage outputs (q=160) and there are eight (p=8) of these matrix switches so as to accommodate the 1,280 (28×32) core outputs 28 and the 1,280 core inputs 30 from the I/O matrix switches [i.e., p=(m×k)/q=(32×48)/160=8)]. A fewer number or a greater number p of core matrix switches 34 could be used in the core stage as long as switching from any of the 1,280 core inputs to any of the 1,280 core outputs of the I/O matrix switches is achievable. Thus, instead of eight 160×160 matrix switches 34, sixteen 80×80 core matrix switches or four 320×320 core matrix switches could be used. In fact, one 1,280×1,280 core matrix switch could be used.

Figure 5C:
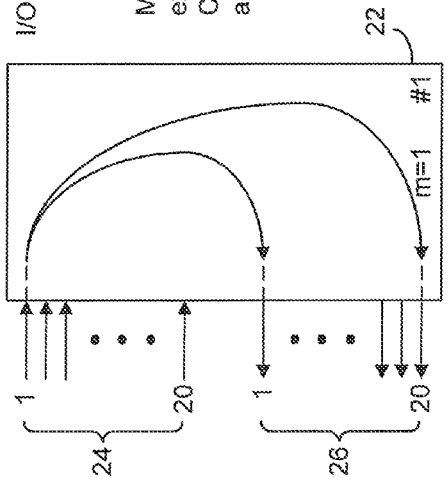
FIG. 5C is an example of a multicast route executed on a single I/O matrix switch.
Figure 5D:
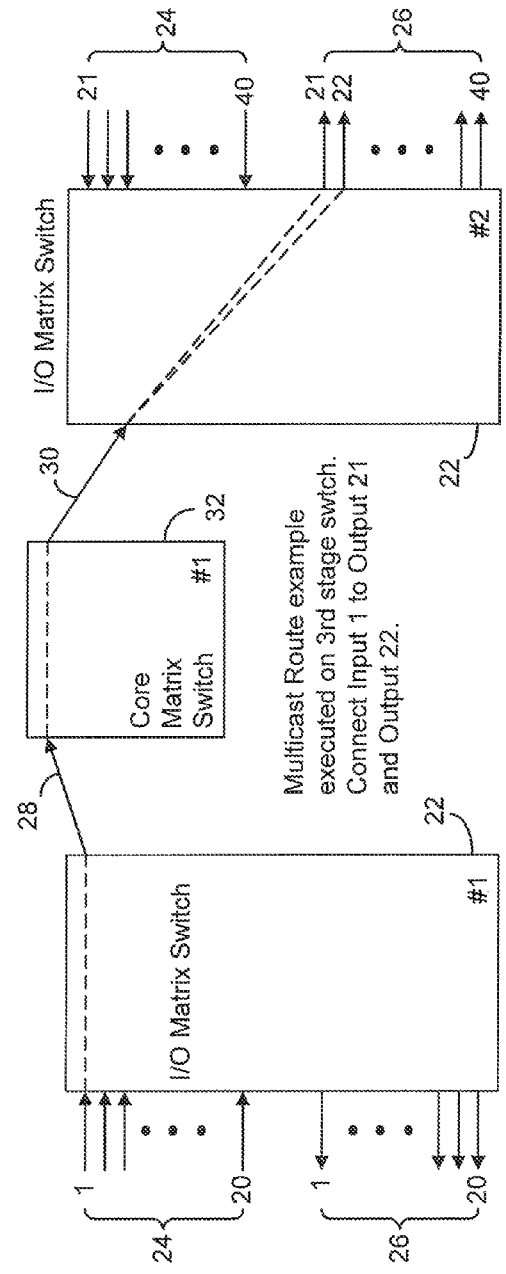
FIG. 5D is an example of a multicast route executed on two I/O matrix switches and one core matrix switch.
Figure 5E:
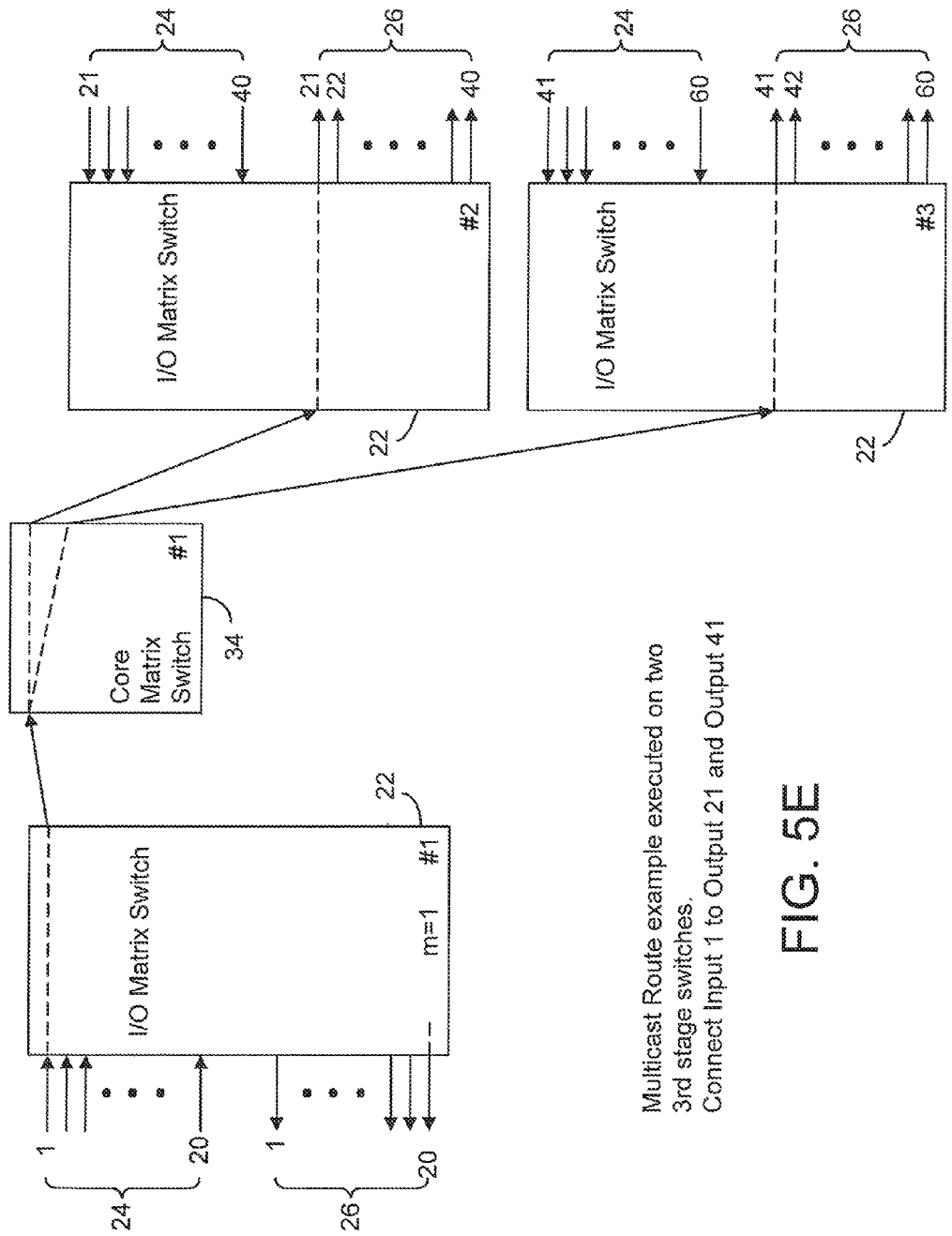
FIG. 5E is an example of a multicast route executed on one I/O matrix switch for input, one core matrix switch, and two I/O matrix switches for outputs.
Figure 5F:
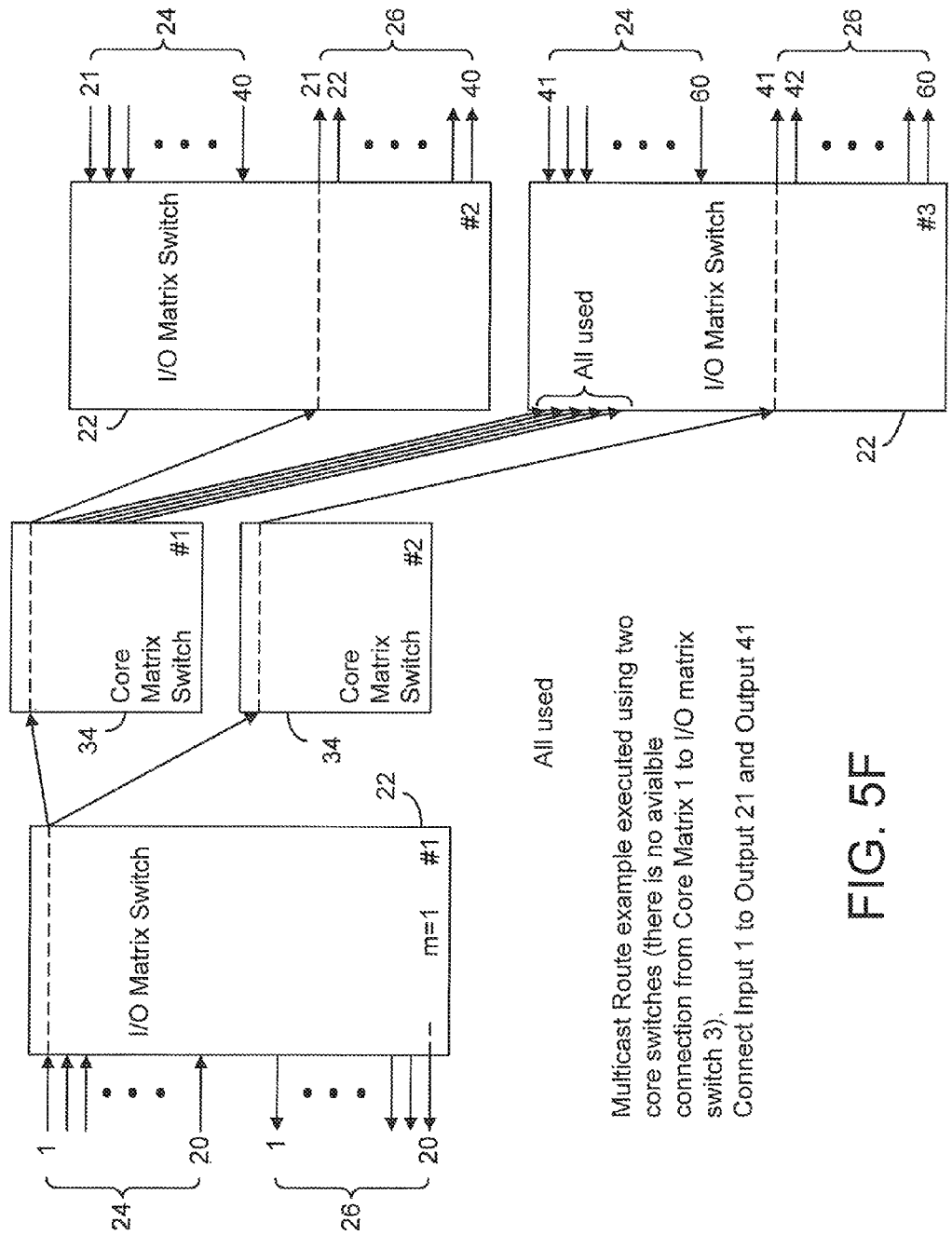
FIG. 5F is an example of a multicast route executed on I/O matrix switch for input, two core matrix switches and two I/O matrix switches for outputs.

Switching examples mentioned above are presented in FIGS. 5A-5F. FIG. 5A shows a unicast route example executed on a single I/O matrix switch 22. FIG. 5B is an example of a unicast route executed on two I/O matrix switches 22 and one core matrix switch 34. FIG. 5C is an example of a multicast route executed on a single I/O matrix switch 22. FIG. 5D is a multicast example executed on two I/O matrix switches 22 and one core matrix switch 34. FIG. 5E is a multicast example executed on one I/O matrix switch 22 for input, one core matrix switch 34, and two I/O matrix switches 22 for outputs. FIG. 5F is a multicast example executed on one I/O matrix switch 22 for the input, two core matrix switches 34 and two I/O matrix switches 22 for outputs.

FIG. 4 is a flow chart which illustrates the switching of the matrix router depending upon the nature of the requested input to the requested output or outputs, as well as depending on whether the switching is unicast or multicast. The actual implementation of the flow chart can be performed by any algorithmic implementing device, such as shown in FIG. 3C, with a CPU 41 and associated program instructions stored in non-transitory memory 43 communicating with each of the I/O matrix switches 22 of I/O stage 21 and each of the matrix switches 34 of the core stage 32. Hardwire logic could also be used in place of or in conjunction with processor 41 and program instructions stored in memory 43 as is well-known in the art.

FIG. 4 shows a switching algorithm 100 having a unicast or multicast decision step 42. If unicast, then decision step 44 determines if the particular input and desired output are on the same I/O matrix switch 22 and, if so, step 46 routes the input to the desired output on that particular I/O matrix switch, thus completing the unicast route (step 48). If decision step 44 is negative, step 50 identifies the core (center) stage matrix switch 34 that has an available input as well as an available output to the desired I/O matrix switch 22 that has the desired output and routes the input through the I/O matrix switch with the desired output. For example, if the first I/O matrix switch 22 has its first input (input 1) to be switched to output 637 on the thirty-second I/O matrix switch (see FIG. 3B) (this I/O matrix switch identified as 22*), then it is necessary for the first I/O matrix switch to route this first input to one of the core matrix switches 34 that has an available core stage input and an available core stage output that can connect this first input and to the $637^{th}$ output (for example, core matrix switch 34* shown in FIG. 3A), thereby achieving the desired connection using three matrix switches (two at the I/O stage and one with the core stage).

If decisional step 42 is multicast, then decision step 54 is encountered similar to decision step 44 for the unicast situation. Decision step 54 determines if the input and output stages of the desired input to the desired outputs of a multicast are on the same I/O matrix switch 22 and if yes, then the input is routed to the desired outputs on the same I/O matrix switch 22 at step 56, thereby completing the multicast route operation 58. If the answer to decision step 54 is negative (for some or all of the desired outputs), then decision step 60 determines if the input has already been routed to the desired output of another I/O switch. If yes, then a multicast route is executed on the determined single I/O matrix switch at step 62, thereby completing the multicast route 58.

If the answer to decision step 60 is negative, then decision step 64 determines if the input has already been routed to a core stage matrix switch 34. If the answer to decision step 64 is affirmative, then decision step 66 determines if the core stage matrix switch has an available output to the desired output(s) on an I/O matrix switch. If the answer to decision step 66 is affirmative, then step 68 executes the multicast route on the core matrix switch 34 and the I/O matrix switch 22 on which the desired output is found. This completes the multicast route 58. If decision step 66 is negative, then step 70 identifies the core stage matrix switch 34 that has an available core stage input and an available core stage output to the desired output so that the route is executed on three switches (two I/O matrix switches 32 containing the input and outputs, and the core matrix switch which has an available core stage input and core stage output connectable to the I/O matrix switch 32 which contains the desired outputs). This is shown by step 72. This completes the multicast route 58.

Finally, if decision step 64 is negative, then steps 70 and 72 are completed to route the desired inputs to the desired outputs.

Thus, what has been described is a matrix router which insures non-blocking switch capability for any input to any output, as well as enhanced multicast capability of any input to multiple outputs.

The matrix router and method of switching utilizes an input/output stage comprising one or more input/output matrix switches, as well as a core stage comprising one or more matrix switches having a sufficient number of inputs and outputs to accommodate the core matrix outputs and core matrix inputs associated with the I/O matrix switches. Enhanced multicast capability is achieved with lower probability of blocking than that associated with Clos type matrix routers.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A matrix router comprising:
   a combined input stage and output stage (I/O stage) having m matrix switch(es), each matrix switch having:
   n inputs and n outputs, each input of said n inputs switchable within said matrix switch to any output of said n outputs;
   k core outputs and k core inputs, each input of said n inputs switchable to any core output of said k core outputs and each core input of said k core inputs switchable to any output of said n outputs; and
   a core stage having a matrix switch having at least m times k core stage inputs and at least m times k core stage outputs, each core stage input connected to one core output of said I/O stage, and each core stage output connected to one core input of said I/O stage;
   where m, n and k are integers and m>=1, n>=2, k>=n; and
   wherein each matrix switch is configured having a minimum of (n+k) times (n+k) switching permutations that enable any of the n inputs of a given matrix switch to be connected to any of the n outputs of the given matrix switch without use of the core stage.

2. The matrix router according to claim 1, where k>=2n−1.

3. The matrix router according to claim 2, wherein the core stage comprises p core matrix switches, each core matrix switch having q core stage inputs and q core stage outputs, where p is an integer and p>=(m×k)/q.

4. The matrix router according to claim 2, wherein k=40, m=32, and q=40.

5. The matrix router according to claim 4, wherein each matrix switch of the I/O stage and each core matrix switch of the core stage is an electrical switch and wherein the I/O stage includes an optical to electrical converter for each of the n inputs and an electrical to optical converter for each of the n outputs.

6. The matrix router according to claim 1, where k>=2n.

7. The matrix router according to claim 4, wherein each matrix switch of the I/O stage and each core matrix switch of the core stage is an optical matrix switch.

8. The matrix router according to claim 1, wherein each matrix switch of the I/O stage and each core matrix switch of the core stage is an electrical switch and wherein the I/O stage includes an optical to electrical converter for each of the n inputs and an electrical to optical converter for each of the n outputs.

9. The matrix router according to claim 1, wherein each matrix switch of the I/O stage and each core matrix switch of the core stage is an optical matrix switch.

10. A method of switching inputs to outputs using a matrix router having a combined input stage and output stage (I/O stage) having m matrix switch(es), each matrix switch having:

n inputs and n outputs, each input of said n inputs switchable within said matrix switch to any output of said n outputs, k core outputs and k core inputs, each input of said n inputs switchable to any core output of said k core outputs and each core input of said k core inputs switchable to any output of said n outputs; and a core stage having a matrix switch having at least m times k core stage inputs and at least m times k core stage outputs, each core stage input connected to one core output of said I/O stage, and each core stage output connected to one core input of said I/O stage, where m, n and k are integers and $m>=1$, $n>=2$, $k>=n$;

the method comprising:

determining if an input is to be switched to a single unicast output or to multicast outputs;

if unicast, determining if the input and output are on a same input/out (I/O) matrix switch and if on the same I/O matrix switch routing the input to the output on the same I/O matrix switch, otherwise identifying a center stage matrix switch that has an available core stage input and an available core stage output to the desired output on a different I/O matrix switch and routing the input to the output on the different I/O matrix switch via said center stage matrix switch; and if multicast, determining if the I/O input is already routed to a center stage matrix switch, and if already routed to a center stage matrix switch, determining if that center stage matrix switch has an available core stage output that is directed to an I/O matrix switch of the desired outputs and routing the input to the desired outputs of said I/O matrix switch via said center stage matrix switch, otherwise identifying a center stage matrix switch that has an available core stage input and core stage output to the desired outputs of another I/O matrix switch and routing the input to the desired outputs via said identified center stage matrix switch.

* * * * *